United States Patent
Townes et al.

(10) Patent No.: US 10,844,721 B2
(45) Date of Patent: Nov. 24, 2020

(54) GAS TURBINE ENGINE FOR AN AIRCRAFT

(71) Applicants: ROLLS-ROYCE PLC, London (GB); ITP NEXT GENERATION TURBINES SLU, Vizcaya (ES)

(72) Inventors: Roderick M Townes, Derby (GB); Diego Torre Ruiz, Madrid (ES)

(73) Assignees: ROLLS-ROYCE plc, London (GB); ITP NEXT GENERATION TURBINES SLU, Zamudio (ES)

( * ) Notice: Subject to any disclaimer, the term of this patent is extended or adjusted under 35 U.S.C. 154(b) by 3 days.

(21) Appl. No.: 16/444,341

(22) Filed: Jun. 18, 2019

(65) Prior Publication Data

US 2020/0291782 A1 Sep. 17, 2020

(30) Foreign Application Priority Data

Mar. 13, 2019 (ES) .................... 201930229

(51) Int. Cl.
*F01D 5/08* (2006.01)
*F01D 5/04* (2006.01)

(52) U.S. Cl.
CPC ............ *F01D 5/08* (2013.01); *F01D 5/043* (2013.01)

(58) Field of Classification Search
None
See application file for complete search history.

(56) References Cited

U.S. PATENT DOCUMENTS

| 5,079,916 A | * | 1/1992 | Johnson | F02K 3/072 60/268 |
|---|---|---|---|---|
| 5,727,755 A | * | 3/1998 | Craig | F02K 3/075 244/53 R |
| 10,583,932 B1 | * | 3/2020 | Stretton | B64D 33/02 |
| 10,648,475 B1 | * | 5/2020 | Stretton | F04D 19/002 |
| 2012/0291449 A1 | | 11/2012 | Adams et al. | |
| 2013/0192200 A1 | | 8/2013 | Kupratis et al. | |
| 2013/0223974 A1 | * | 8/2013 | Schwarz | F02C 9/22 415/1 |
| 2016/0130961 A1 | * | 5/2016 | Baralon | F01D 9/02 415/144 |
| 2020/0049022 A1 | * | 2/2020 | Stretton | F01D 9/041 |
| 2020/0200096 A1 | * | 6/2020 | Stretton | F02K 3/06 |
| 2020/0200097 A1 | * | 6/2020 | Stretton | F02C 9/18 |
| 2020/0248699 A1 | * | 8/2020 | Stretton | F04D 19/002 |

* cited by examiner

*Primary Examiner* — Michael Lebentritt
(74) *Attorney, Agent, or Firm* — Oliff PLC

(57) ABSTRACT

A gas turbine engine for an aircraft includes an engine core with a turbine, a compressor, and a core shaft connecting them. The engine includes a fan, with a plurality of fan blades, located upstream of the core and a gearbox receiving an input from the core shaft and outputting drive so the fan is at a lower rotational speed than the core shaft. The turbine includes a plurality of stages of axially spaced rotor blades mounted on a rotor, which are surrounded by a turbine casing. The turbine has an inlet defined at an upstream end of a first stage of blades and an outlet defined at a downstream end of a last stage of blades and a ratio of the area of the outlet to the inlet is at between 2.5 and 3.5. This increases the pressure ratio of and power extracted from the turbine and the engine.

20 Claims, 3 Drawing Sheets

GAS TURBINE ENGINE FOR AN AIRCRAFT

The present disclosure relates to a gas turbine engine for an aircraft and in particular to a geared gas turbine engine for an aircraft.

Currently a geared gas turbine engine for an aircraft is arranged to have a relatively low pressure ratio turbine and thus the geared gas turbines generates a relatively low power.

There is a requirement for a geared gas turbine engine for an aircraft to have a relatively high power, e.g. for the low pressure turbine to have a relatively high power greater than 38,000 horsepower, 28.3 Megawatts, at maximum take-off condition.

According to a first aspect there is provided a gas turbine engine for an aircraft comprising:
  an engine core comprising a turbine, a compressor, and a core shaft connecting the turbine to the compressor;
  a fan located upstream of the engine core, the fan comprising a plurality of fan blades; and
  a gearbox that receives an input from the core shaft and outputs drive to the fan so as to drive the fan at a lower rotational speed than the core shaft, wherein:
  the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5.

The ratio of the area of the outlet to the area of the inlet may be at least 2.6 and no more than 3.2.

The turbine rotor blades may have platforms and shrouds, the inlet is defined between the platforms and the shrouds of the first stage of turbine rotor blades and the outlet is defined between the platforms and the shrouds of the last stage of turbine rotor blades.

The turbine rotor blades may have aerofoils comprising leading edges and trailing edges and the inlet is defined between the platforms and the shrouds of the first stage of turbine rotor blades at the axial position where the leading edges of the aerofoils of the turbine rotor blades intersect the platforms and the shrouds of the first stage of turbine rotor blades and the outlet is defined between the platforms and the shrouds of the last stage of turbine rotor blades at the axial position where the trailing edges of the aerofoils of the turbine rotor blades intersect the platforms and the shrouds of the last stage of turbine rotor blades.

The turbine rotor blades may have platforms, the inlet is defined between the platforms of the first stage of turbine rotor blades and the turbine casing and the outlet is defined between the platforms the last stage of turbine rotor blades and the turbine casing.

The turbine rotor blades may have aerofoils comprising leading edges and trailing edges, the inlet is defined between the platforms of the first stage of turbine rotor blades and the turbine casing at the axial position where the leading edges of the aerofoils of the turbine rotor blades intersect the platforms of the first stage of turbine rotor blades and the outlet is defined between the platforms of the last stage of turbine rotor blades and the turbine casing at the axial position where the trailing edges of the aerofoils of the turbine rotor blades intersect the platforms of the last stage of turbine rotor blades.

The turbine rotor blades may have platforms, the turbine casing carrying a seal arrangement, the turbine seal arrangement surrounding the turbine rotor blades and being arranged radially between the turbine rotor blades and the turbine casing, the inlet is defined between the platforms of the first stage of turbine rotor blades and the turbine seal arrangement and the outlet is defined between the platforms of the last stage of turbine rotor blades and the turbine seal arrangement.

The turbine rotor blades may have aerofoils comprising leading edges and trailing edges, the inlet is defined between the platforms of the first stage of turbine rotor blades and the turbine seal arrangement at the axial position where the leading edges of the aerofoils of the turbine rotor blades intersect the platforms of the first stage of turbine rotor blades and the outlet is defined between the platforms of the last stage of turbine rotor blades and the turbine seal arrangement at the axial position where the trailing edges of the aerofoils of the turbine rotor blades intersect the platforms of the last stage of turbine rotor blades.

An axial length of the turbine between the inlet and the outlet may be at least 230 mm, for example at least 235 mm, or at least 240 mm, or at least 245 mm. Moreover, the axial length of the turbine between the inlet and the outlet may be less 580 mm, for example less than 575 mm, or less than 570 mm, or less than 565 mm.

The axial length of the turbine between the inlet and the outlet may be in an inclusive range bounded by any two of the values in the previous two sentences (i.e. the values may form lower and upper bounds, respectively). For example, the axial length of the turbine between the inlet and the outlet may be comprised between 230 mm and 580 mm, or between 250 mm and 560 mm, or between 300 mm and 500 mm, or between 300 mm and 450 mm, or between 300 mm and 400 mm, or between 315 mm and 500 mm, or between 315 mm and 450 mm, or between 315 mm and 400 mm.

The upstream ends of the platforms of the first stage of turbine rotor blades may be arranged at a first radius, the downstream ends of the platforms of the last stage of turbine rotor blades are arranged at a second radius.

The second radius may be greater than the first radius, equal to the first radius or less than the first radius. The ratio of the first radius to the second radius may be greater than or equal to 0.8 and less than or equal to 1.17, For example, the ratio of the first radius to the second radius may be greater than 0.85, or greater than 0.9, or greater than 0.95, or greater than 1, or greater than 1.05. Moreover, the ratio of the first radius to the second radius may be less than 1.15, or less than 1.14, or less than 1.13.

The ratio of the first radius to the second radius may be in an inclusive range bounded by any two of the values in the previous two sentences (i.e. the values may form lower and upper bounds, respectively). For example, the ratio of the first radius to the second radius may be comprised between 0.9 and 1.17, or between 1 and 1.17, or between 1.07 and 1.17.

The turbine may comprise a plurality of axially spaced stages of turbine stator vanes, the turbine stator vanes have platforms, a first stage of turbine stator vanes is arranged upstream of the first stage of turbine rotor blades and a last stage of turbine stator vanes is arranged upstream of the last stage of turbine rotor blades.

An intermediate stage of turbine stator vanes may be arranged downstream of the first stage of turbine stator vanes and upstream of the last stage of turbine stator vanes, the platforms of the intermediate stage of turbine stator vanes have a third radius, the third radius is greater than or equal to the first radius and is greater than the second radius.

The ratio of the third radius to the first radius may be greater than or equal to 1 and less than or equal to 1.3. For example, the ratio of the third radius to the first radius may be greater than 1.05, or greater than 1.07, or greater than 1.1. Moreover, the ratio of the third radius to the first radius may be less than 1.25, or less than 1.23, or less than 1.2.

The ratio of the second radius to the third radius may be greater than or equal to 0.8 and less than or equal to 0.95. For example, the ratio of the second radius to the third radius may be greater than or equal to 0.8 and less than 0.9, or less than 0.85.

The ratio of the third radius to the first radius may be greater than or equal to 1 and less than or equal to 1.3 and the ratio of the second radius to the third radius is greater than or equal to 0.8 and less than 0.95.

There may be four stages of turbine rotor blades and four stages of turbine stator vanes, the intermediate stage of turbine stator vanes is the second stage of turbine stator vanes or the third stage of turbine stator vanes.

An intermediate stage of turbine rotor blades may be arranged downstream of the first stage of turbine rotor blades and upstream of the last stage of turbine rotor blades, the platforms of the intermediate stage of turbine rotor blades have a third radius, the third radius is greater than or equal to the first radius and is greater than the second radius.

The ratio of the third radius to the first radius may be greater than or equal to 1 and less than or equal to 1.3. For example, the ratio of the third radius to the first radius may be greater than 1.05, or greater than 1.07, or greater than 1.1. Moreover, the ratio of the third radius to the first radius may be less than 1.25, or less than 1.23, or less than 1.2.

The ratio of the second radius to the third radius may be greater than or equal to 0.8 and less than or equal to 0.95. For example, the ratio of the second radius to the third radius may be greater than or equal to 0.8 and less than 0.9, or less than 0.85.

The ratio of the third radius to the first radius may be greater than or equal to 1.05 and less than or equal to 1.3 and the ratio of the second radius to the third radius is greater than or equal to 0.8 and less than 0.95.

There may be four stages of turbine rotor blades and four stages of turbine stator vanes, the intermediate stage of turbine rotor blades is the third stage of turbine rotor blades or the third stage of turbine rotor blades.

The third radius may be greater than the first radius, the third radius is greater than the second radius and the second radius is greater than the first radius.

The third radius may be greater than the first radius, the third radius is greater than the second radius and the second radius is equal to the first radius.

The third radius may be equal to the first radius, the third radius is greater than the second radius and the second radius is less than the first radius.

The turbine rotor blades and the turbine stator vanes may comprise an intermetallic material. The turbine rotor blades and the turbine stator vanes may comprise titanium aluminide. The turbine stator blades and the turbine stator vanes may comprise gamma titanium aluminide.

The turbine may be a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

According to an aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5,
the turbine rotor blades have platforms and shrouds, the inlet is defined between the platforms and the shrouds of the first stage of turbine rotor blades and the outlet is defined between the platforms and the shrouds of the last stage of turbine rotor blades,
the upstream ends of the platforms of the first stage of turbine rotor blades are arranged at a first radius, the downstream ends of the platforms of the last stage of turbine rotor blades are arranged at a second radius,
the turbine comprises a plurality of axially spaced stages of turbine stator vanes, the turbine stator vanes have platforms, a first stage of turbine stator vanes is arranged upstream of the first stage of turbine rotor blades and a last stage of turbine stator vanes is arranged upstream of the last stage of turbine rotor blades, an intermediate stage of turbine stator vanes is arranged downstream of the first stage of turbine stator vanes and upstream of the last stage of turbine stator vanes, the platforms of the intermediate stage of turbine stator vanes have a third radius, the third radius is greater than or equal to the first radius and is greater than the second radius,
the ratio of the first radius to the second radius is greater than or equal to 0.8 and less than or equal to 1.17, the ratio of the third radius to the first radius is greater than or equal to 1 and less than or equal to 1.3 and the ratio of the second radius to the third radius is greater than or equal to 0.8 and less than or equal to 0.95.

According to an aspect there is provided a gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5, the turbine rotor blades have platforms and shrouds, the inlet is defined between the platforms and the shrouds of the first stage of turbine rotor blades and the outlet is defined between the platforms and the shrouds of the last stage of turbine rotor blades, the upstream ends of the platforms of the first stage of turbine rotor blades are arranged at a first radius, the downstream ends of the platforms of the last stage of turbine rotor blades are arranged at a second radius, an intermediate stage of turbine rotor blades is arranged downstream of the first stage of turbine rotor blades and upstream of the last stage of turbine rotor blades, the platforms of the intermediate stage of turbine rotor blades have a third radius, the third radius is greater than or equal to the first radius and is greater than the second radius, the ratio of the first radius to the second radius is greater than or equal to 0.8 and less than or equal to 1.17, the ratio of the third radius to the first radius is greater than or equal to 1 and less than or equal to 1.3 and the ratio of the second radius to the third radius is greater than or equal to 0.8 and less than or equal to 0.95.

According to an aspect there is provided a method of operating a gas turbine engine for an aircraft, the gas turbine engine comprising:

an engine core comprising a turbine, a compressor, and a core shaft connecting the turbine to the compressor;

a fan located upstream of the engine core, the fan comprising a plurality of fan blades; and a gearbox that receives an input from the core shaft (26) and outputs drive to the fan so as to drive the fan at a lower rotational speed than the core shaft, wherein:

the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5, the method comprising operating the gas turbine engine with a mean axial Mach number at the inlet to the first stage of turbine rotor blades equal to or greater than 0.15 and equal to or less than 0.35 at cruise conditions and the mean axial Mach number at the outlet of the last stage of turbine rotor blades is equal to or greater than 0.45 and is equal to or less than 0.60 at cruise conditions.

In the method of operating a gas turbine engine for an aircraft, the last stage of turbine rotor blades $AN^2$ may be equal to or greater than 6.0 in$^2$×RPM$^2$/1×10$^{10}$ and may be equal to or less than 7.0 in$^2$×RPM$^2$/1×10$^{10}$ at the highest turbine rotor speed conditions.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm, or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31 or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 13 to 16, or 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or a bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24, or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
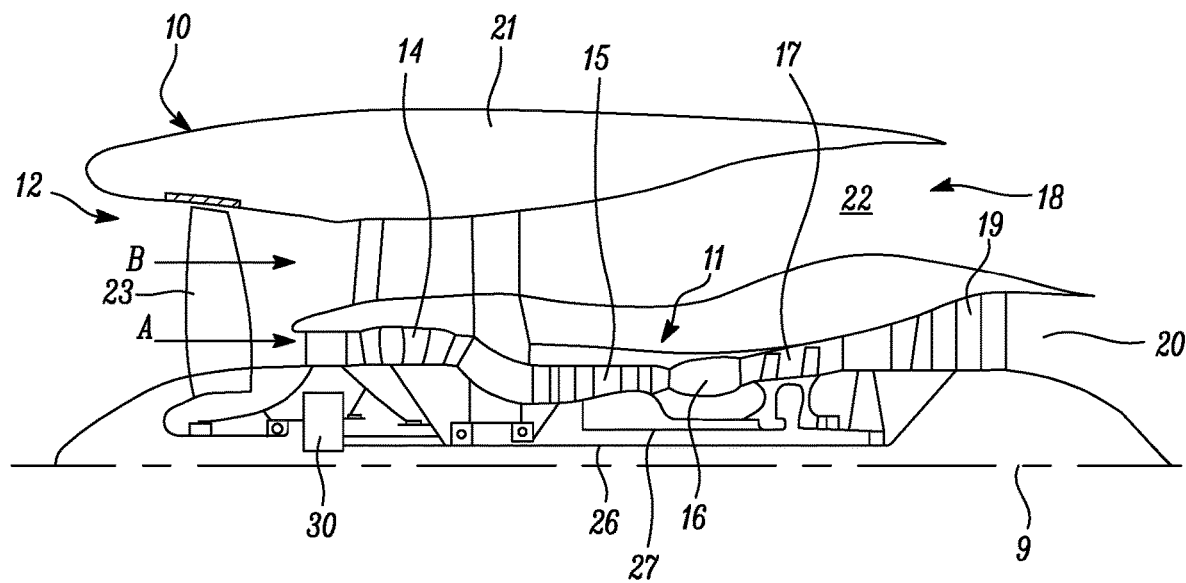
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
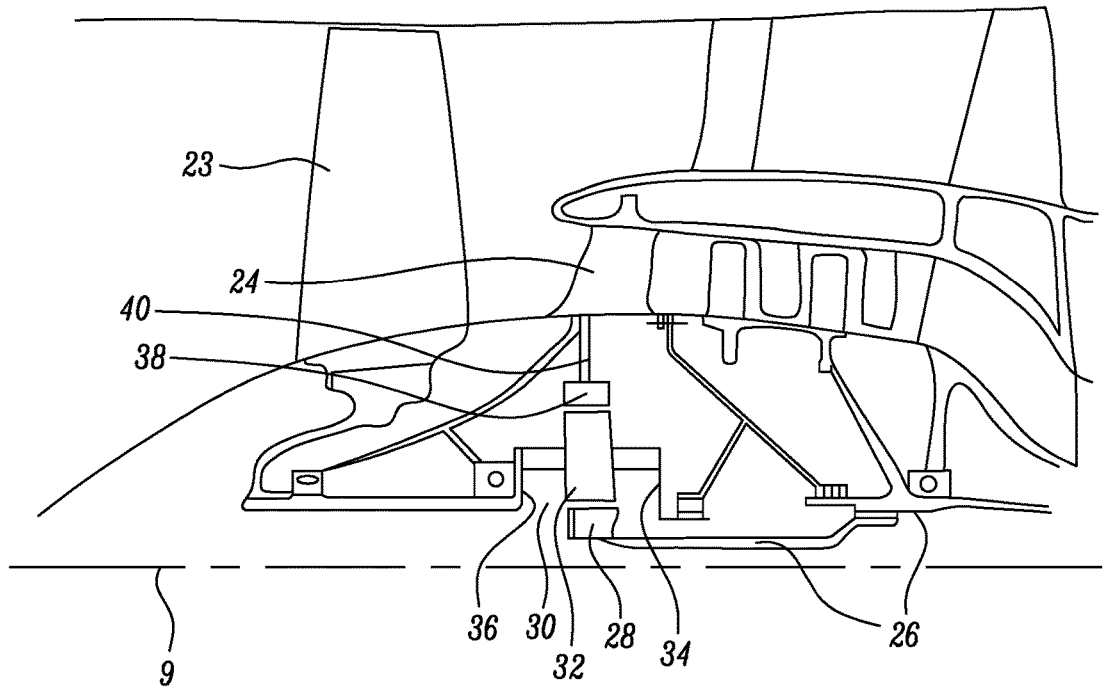
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
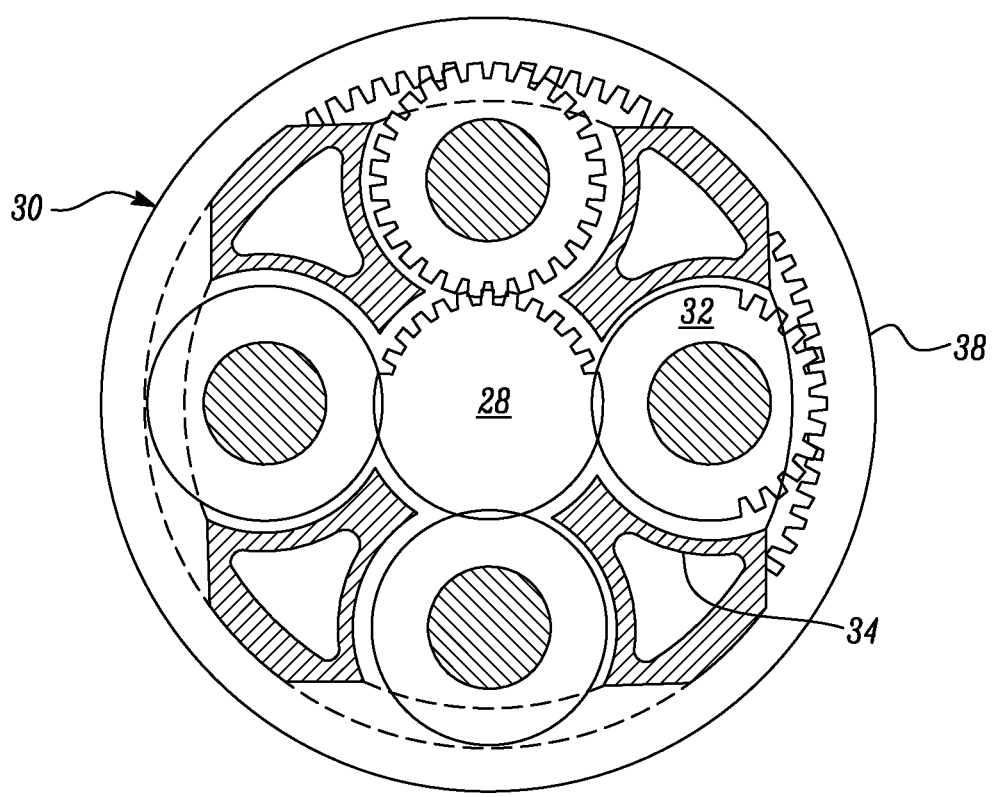
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2. Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 18 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example or a turbo shaft engine which may be arranged to drive an electrical generator. The electrical generator may be used to supply electrical power to one or more electrical motors to drive one or more fans for a hybrid propulsion arrangement or may be simply for the supply of electrical power. In some arrangements, the gas turbine engine 10 may not comprise a gearbox 30, for example a high speed high pressure ratio fan of a low bypass ratio turbofan gas turbine engine.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
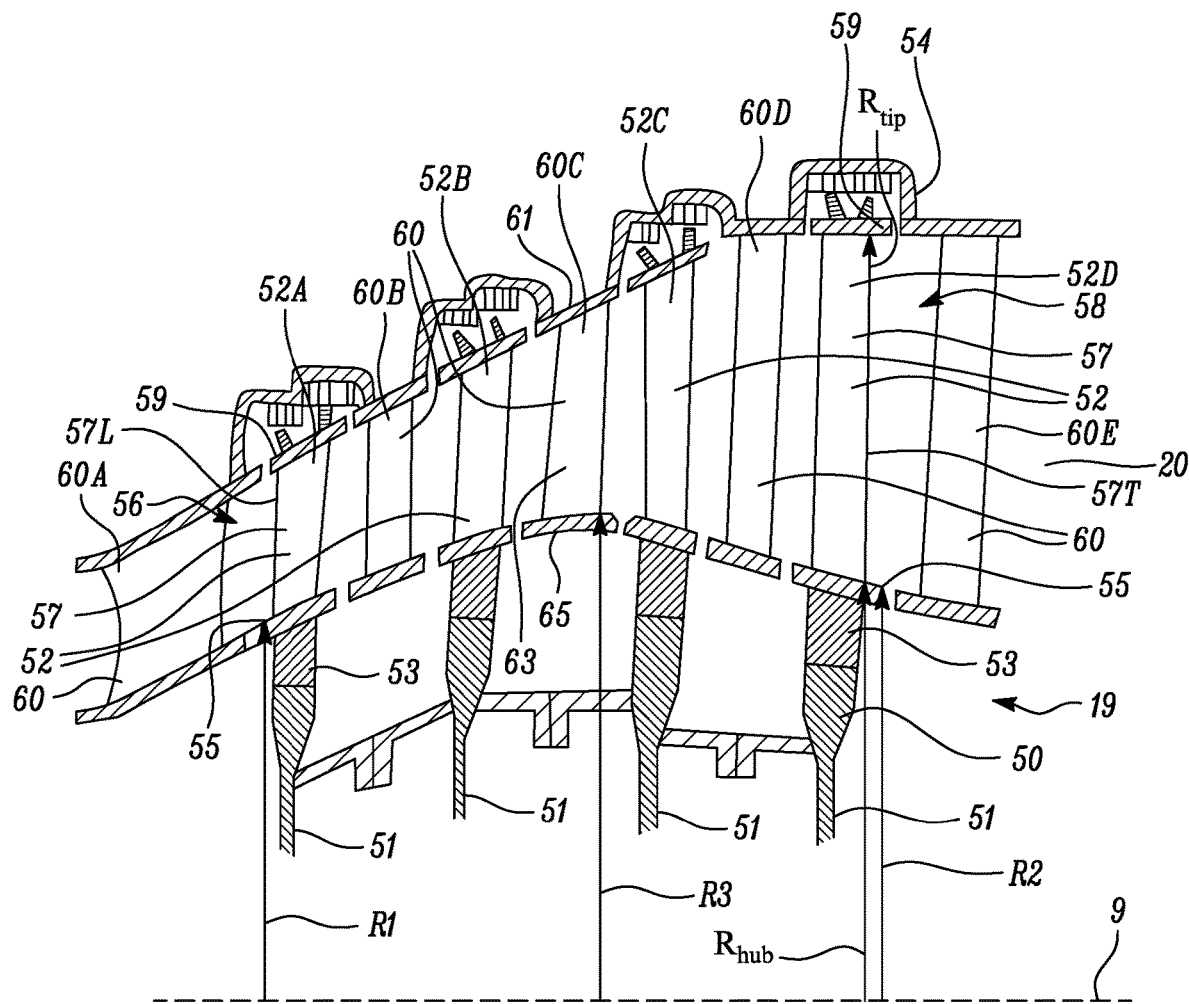
FIG. 4 is an enlarged cross-sectional view through the low pressure turbine of the gas turbine engine.

FIG. 4 shows the low pressure turbine 19 of the gas turbine engine 10 in more detail. As mentioned above the low pressure turbine 19 is arranged to drive the fan 23 via the shaft 26 and the epicyclic gearbox 30. The low pressure turbine 19 is arranged to extract greater power from the hot combustion products in order to drive the fan 23 via the shaft 26 and the epicyclic gearbox 30. The low pressure turbine 19 is arranged to produce a high pressure ratio between the inlet and the outlet of the low pressure turbine 19 and thus the low pressure turbine 19 has a high ratio between the area of the outlet to the area of the inlet of the low pressure turbine 19. The low pressure turbine 19 comprises a turbine rotor 50 and a plurality of stages of axially spaced turbine rotor blades 52A, 52B, 52C and 52D mounted on the turbine rotor 50. The turbine rotor 50 comprises a plurality of turbine discs 51 which have axially extending flanges which are secured together by bolted connections. The turbine rotor 50 and turbine rotor blades 52 are surrounded by a turbine casing 54. The low pressure turbine 19 has an inlet 56 defined at an upstream end of a first stage of turbine rotor blades 52A and an outlet 58 defined at a downstream end of a last stage of turbine rotor blades 52D.

The ratio of the area of the outlet 58 to the area of the inlet 56 is at least 2.5 and is no more than 3.5. The ratio of the area of the outlet 58 to the area of the inlet 56 may be at least 2.6 and is no more than 3.2.

An axial length, i.e. a distance along the principal rotational axis 9, of the low pressure turbine 19 between the inlet 56 and the outlet 58 may be at least 230 mm, for example at least 235 mm, or at least 240 mm, or at least 245 mm. Moreover, the axial length of the low pressure turbine 19 between the inlet 56 and the outlet 58 may be less 580 mm, for example less than 575 mm, or less than 570 mm, or less than 565 mm.

Each turbine rotor blade 52 comprises a root 53, a platform 55, an aerofoil 57 and a shroud 59. The root 53 extends in a first direction, radially inward direction, from the platform 55 and the aerofoil 57 extends a second opposite direction, radially outward direction, from the platform 55 and the shroud 59 is remote from the root 53 and platform 55. The roots 53 of the turbine rotor blades 52 are located in slots in the rim of the corresponding turbine disc 51. The inlet 56 is defined between the platforms 55 and the shrouds 59 of the first stage of turbine rotor blades 52A and the outlet 58 is defined between the platforms 55 and the shrouds 59 of the last stage of turbine rotor blades 52D. Thus, the inlet 56 is an annular inlet and is defined radially between the platforms 55 and the shrouds 59 of the first stage of turbine rotor blades 52A. Similarly, the outlet 58 is an annular outlet and is defined radially between the platforms 55 and the shrouds 59 of the last stage of turbine rotor blades 52D.

The aerofoils 57 of the turbine rotor blades 52 have leading edges 57L and trailing edges 57T and the inlet 56 is defined between the platforms 55 and the shrouds 59 of the first stage of turbine rotor blades 52A at the axial position where the leading edges 57L of the aerofoils 57 of the turbine rotor blades 52 intersect the platforms 55 and the shrouds 59 of the first stage of turbine rotor blades 52A and the outlet 58 is defined between the platforms 55 and the shrouds 59 of the last stage of turbine rotor blades 52D at the axial position where the trailing edges 57T of the aerofoils 57 of the turbine rotor blades 52 intersect the platforms 55 and the shrouds 59 of the last stage of turbine rotor blades 52D.

In another arrangement, not shown, each turbine rotor blade 52 comprises a root 53, a platform 55 and an aerofoil 57 only, e.g. the turbine blades are unshrouded turbine blades, and the annular inlet 56 is defined between the platforms 55 of the first stage of turbine rotor blades 52A and the turbine casing 54 and the annular outlet 58 is defined between the platforms 55 of the last stage of turbine rotor blades 52D and the turbine casing 54. The turbine casing 54 may carry a seal arrangement, not shown. The turbine seal arrangement may surround the turbine rotor blades and may be arranged radially between the turbine rotor blades and the turbine casing. The inlet is defined between the platforms of the first stage of turbine rotor blades and the turbine seal arrangement and the outlet is defined between the platforms of the last stage of turbine rotor blades and the turbine seal arrangement.

The upstream ends of the platforms 55 of the first stage of turbine rotor blades 52A are arranged at a first radius $R_1$, the downstream ends of the platforms 55 of the last stage of turbine rotor blades 52D are arranged at a second radius $R_2$ and the second radius $R_2$ is greater than the first radius $R_1$. However, in other arrangements the second radius $R_2$ is equal to the first radius $R_1$ or the second radius $R_2$ is less than the first radius $R_1$. The ratio of the first radius $R_1$ to the second radius $R_2$ may be greater than or equal to 0.8 and less than or equal to 1.17.

The low pressure turbine 19 also comprises a plurality of axially spaced stages of turbine stator vanes 60A, 60B, 60C and 60D and each turbine stator vane 60 comprises an outer platform 61, an aerofoil 63 and an inner platform 65. A first stage of turbine stator vanes 60A is arranged upstream of the first stage of turbine rotor blades 52A and a last stage of turbine stator vanes 60D is arranged upstream of the last stage of turbine rotor blades 52D. An intermediate stage of turbine stator vanes 60C is arranged downstream of the first stage of turbine stator vanes 60A and upstream of the last stage of turbine stator vanes 60D. The inner platforms 65 of the intermediate stage of turbine stator vanes 60C have a third radius $R_3$ and the third radius $R_3$ is greater than or equal to the first radius $R_1$ and is greater than the second radius $R_2$. The ratio of the third radius $R_3$ to the first radius $R_1$ is greater than or equal to 1 and less than or equal to 1.3. The ratio of the second radius $R_2$ to the third radius $R_3$ is greater than or equal to 0.8 and less than or equal to 0.95. The ratio of the third radius $R_3$ to the first radius $R_1$ is greater than or equal to 1.05 and less than or equal to 1.3 and the ratio of the second radius $R_2$ to the third radius $R_3$ is greater than or equal to 0.8 and less than 0.95.

In this arrangement the third radius $R_3$ is greater than the first radius $R_1$, the third radius $R_3$ is greater than the second radius $R_2$ and the second radius $R_2$ is greater than the first radius $R_1$. However, in another arrangement the third radius $R_3$ is greater than the first radius $R_1$, the third radius $R_3$ is greater than the second radius $R_2$ and the second radius $R_2$ is equal to the first radius $R_1$. However, in a further arrangement the third radius $R_3$ is equal to the first radius $R_1$, the third radius $R_3$ is greater than the second radius $R_2$ and the second radius $R_2$ is less than the first radius $R_1$.

It is noted that the radius of the shrouds 59 of the turbine rotor blades 52 increases progressively from the first stage of turbine rotor blades 52A to the last stage of turbine rotor blades 52D. Similarly, the outer platforms 61 of the turbine stator vanes 60 increases progressively from the first stage of turbine stator vanes 60A to the last stage of turbine stator vanes 60D. It is also noted that the radius of the inner platforms 65 of the turbine stator vanes 60 increases progressively from the first stage of turbine stator vanes 60A to the intermediate stage of turbine stator vanes 60C and then decreases progressively from the intermediate stage of turbine stator vanes 60C to the last stage of turbine stator vanes 60D. Similarly, the platforms 55 of the turbine rotor blades 52 increases progressively from the first stage of turbine rotor blades 52A to the intermediate stage of turbine stator vanes 60C and then decreases progressively from the intermediate stage of turbine stator vanes 60C to the last stage of turbine rotor blades 52D. The radial length of the turbine rotor blades 52 increases progressively from the first stage of turbine rotor blades 52A to the last stage of turbine rotor blades 52D. The radial length of the turbine stator vanes 60 increases progressively from the first stage of turbine stator vanes 60A to the last stage of turbine stator vanes 60D.

In this example there are four stages of turbine rotor blades 50A, 50B, 50C and 50D and four stages of turbine stator vanes 60A, 60B, 60C and 60D, the intermediate stage of turbine stator vanes 60C is the third stage of turbine stator vanes, but the intermediate stage of stator vanes may be the second stage of turbine stator vanes. However, in other arrangements there may be three stages of turbine rotor blades and three stages turbine stator vanes and the intermediate stage of turbine stator vanes is the second stage of turbine stator vanes or there may be five stages of turbine rotor blades and five stages of turbine stator vanes and the intermediate stage of turbine stator vanes is the second stage of turbine stator vanes, the third stage of turbine stator vanes or the fourth stage of turbine stator vanes.

The low pressure turbine 19 also comprises a stage of turbine outlet guide vanes 60E positioned axially downstream of the last stage of turbine rotor blades 52D.

The mean axial Mach number at the inlet to the first stage of turbine rotor blades 50A is equal to or greater than 0.15 and equal to or less than 0.35 at cruise conditions and the mean axial Mach number at the outlet of the last stage of turbine rotor blades 50D is equal to or greater than 0.45 and is equal to or less than 0.60 at cruise conditions. The mean axial Mach number at the inlet to the first stage of turbine rotor blades 50A is equal to or greater than 0.18 and is equal to or less than 0.30 at cruise conditions and the mean axial Mach number at the outlet of the last stage of turbine rotor blades 50D is equal to or greater than 0.48 and is equal to or less than 0.57 at cruise conditions. The mean axial Mach number at the inlet to the first stage of turbine rotor blades 50A for example is 0.2 at cruise conditions and the mean axial Mach number at the outlet of the last stage of turbine rotor blades 50D is 0.54 to 0.57 at cruise conditions.

The last stage of turbine rotor blades $AN^2$ is equal to or greater than 6.0 and is equal to, or less than, 7.0 in$^2 \times$RPM$^2$/$1 \times 10^{10}$, e.g. 7863.0 m$^2 \times$RPM$^2$ to 9173.5 m$^2 \times$RPM$^2$ at the highest rotor speed conditions. $AN^2 = n (R_{tip}^2 - R_{hub}^2) \times$RPM$^2$, where $R_{tip}$ is the radial distance from the engine axis to the point of intersection of the trailing edges 57T of the aerofoils 57 and the shrouds 59 of the last stage of turbine rotor blades 52D, $R_{hub}$ is the radial distance from the engine axis to the point of intersection of the trailing edges 57T of the aerofoils 57 and the platforms 55 of the last stage of turbine rotor blades 52D and RPM is the maximum speed of rotation of the low pressure turbine rotor 50 within the operating cycle of the gas turbine engine 10.

Note that m=r×V×A, where m=mass flow rate, r=density, V=velocity and A=Area and for an ideal compressible gas m=((A×p$_t$)/√T$_t$)×√(γ/R)×M×(1+(1+((γ−1)/2)×M$^2$)−((γ+1)/(2×(γ−1)), where m=mass flow rate, A=Area, p=pressure, R=gas constant, M=Mach number, T=temperature, γ=specific heat ratio, t denotes total conditions.

In another arrangement an intermediate stage of turbine rotor blades is arranged downstream of the first stage of turbine rotor blades and upstream of the last stage of turbine rotor blades, the platforms of the intermediate stage of turbine rotor blades have a third radius, the third radius is greater than or equal to the first radius and is greater than the second radius. In this arrangement the radius of the shrouds of the turbine rotor blades increases progressively from the first stage of turbine rotor blades to the last stage of turbine rotor blades. Similarly, the outer platforms of the turbine stator vanes increases progressively from the first stage of turbine stator vanes to the last stage of turbine stator vanes. In this arrangement the platforms of the turbine rotor blades increases progressively from the first stage of turbine rotor blades to the intermediate stage of turbine rotor blades and then decreases progressively from the intermediate stage of turbine rotor blades to the last stage of turbine rotor blades. The radius of the inner platforms of the turbine stator vanes increases progressively from the first stage of turbine stator vanes to the intermediate stage of turbine stator vanes and then decreases progressively from the intermediate stage of turbine rotor blades to the last stage of turbine stator vanes. The radial length of the turbine rotor blades increases progressively from the first stage of turbine rotor blades to the last stage of turbine rotor blades. The radial length of the turbine stator vanes increases progressively from the first stage of turbine stator vanes to the last stage of turbine stator vanes.

The ratio of the third radius to the first radius may be greater than or equal to 1 and less than or equal to 1.3. The ratio of the second radius to the third radius may be greater than or equal to 0.8 and less than or equal to 0.95. The ratio of the third radius to the first radius may be greater than or equal to 1.05 and less than or equal to 1.3 and the ratio of the second radius to the third radius is greater than or equal to 0.8 and less than 0.95.

The ratio of the area of the outlet 58 to the area of the inlet 56 of at least 2.5 and no more than 3.5 allows higher power to be extracted from the low pressure turbine 19 by enabling an increased turbine pressure ratio. The proposed allows these to be achieved in a most efficient way including both aerodynamic efficiency and weight efficiency.

The turbine rotor blades 52 and the turbine stator vanes 54 may comprise an intermetallic material. The turbine rotor blades 52 and the turbine stator vanes 60 may comprise titanium aluminide and in particular the turbine stator blades 52 and the turbine stator vanes 60 may comprise gamma titanium aluminide.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:
    an engine core comprising a turbine, a compressor, and a core shaft connecting the turbine to the compressor;
    a fan located upstream of the engine core, the fan comprising a plurality of fan blades; and
    a gearbox that receives an input from the core shaft and outputs drive to the fan so as to drive the fan at a lower rotational speed than the core shaft, wherein:
    the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5.

2. The gas turbine engine according to claim 1 wherein the ratio of the area of the outlet to the area of the inlet is at least 2.6 and is no more than 3.2.

3. The gas turbine engine according to claim 1 wherein the turbine rotor blades have platforms and shrouds, the inlet is defined between the platforms and the shrouds of the first stage of turbine rotor blades and the outlet is defined between the platforms and the shrouds of the last stage of turbine rotor blades, or wherein the turbine rotor blades have platforms, the inlet is defined between the platforms of the first stage of turbine rotor blades and the turbine casing and the outlet is defined between the platforms of the last stage of turbine rotor blades and the turbine casing.

4. The gas turbine engine according to claim 3 wherein the upstream ends of the platforms of the first stage of turbine rotor blades are arranged at a first radius, the downstream ends of the platforms of the last stage of turbine rotor blades are arranged at a second radius and the ratio of the first radius to the second radius is greater than or equal to 0.8 and less than or equal to 1.17.

5. The gas turbine engine according to claim 3 wherein the turbine comprises a plurality of axially spaced stages of turbine stator vanes, the turbine stator vanes have platforms, a first stage of turbine stator vanes is arranged upstream of the first stage of turbine rotor blades and a last stage of turbine stator vanes is arranged upstream of the last stage of turbine rotor blades.

6. The gas turbine engine according to claim 5 wherein an intermediate stage of turbine stator vanes is arranged downstream of the first stage of turbine stator vanes and upstream of the last stage of turbine stator vanes, the platforms of the intermediate stage of turbine stator vanes have a third radius, the third radius is greater than or equal to the first radius and is greater than the second radius, and optionally wherein the ratio of the third radius to the first radius is greater than or equal to 1 and less than or equal to 1.3.

7. The gas turbine engine according to claim 6 wherein the ratio of the second radius to the third radius is greater than or equal to 0.8 and less than or equal to 0.95.

8. The gas turbine engine according to claim 6 wherein the ratio of the third radius to the first radius is greater than or equal to 1.05 and less than or equal to 1.3 and the ratio of the second radius to the third radius is greater than or equal to 0.8 and less than 0.95.

9. The gas turbine engine according to claim 6 wherein there are four stages of turbine rotor blades and four stages of turbine stator vanes, the intermediate stage of turbine stator vanes is the third stage of turbine stator vanes.

10. The gas turbine engine according claim 4 wherein an intermediate stage of turbine rotor blades is arranged downstream of the first stage of turbine rotor blades and upstream of the last stage of turbine rotor blades, the platforms of the intermediate stage of turbine rotor blades have a third radius, the third radius is greater than or equal to the first radius and is greater than the second radius.

11. The gas turbine engine according to claim 10 wherein the ratio of the third radius to the first radius is greater than or equal to 1 and less than or equal to 1.3, and/or wherein the ratio of the second radius to the third radius is greater than or equal to 0.8 and less than or equal to 0.95, and/or wherein the ratio of the third radius to the first radius is greater than or equal to 1.05 and less than or equal to 1.3 and the ratio of the second radius to the third radius is greater than or equal to 0.8 and less than 0.95.

12. The gas turbine engine according to claim 6 wherein the third radius is greater than the first radius, the third radius is greater than the second radius and the second radius is greater than the first radius.

13. The gas turbine engine according to claim 1 wherein the turbine rotor blades and the turbine stator vanes comprise an intermetallic material.

14. The gas turbine engine according to claim 13 wherein the turbine rotor blades and the turbine stator vanes comprise titanium aluminide, and/or wherein the turbine stator blades and the turbine stator vanes comprise gamma titanium aluminide.

15. The gas turbine engine according to claim 1 wherein:
    the turbine is a first turbine, the compressor is a first compressor, and the core shaft is a first core shaft;

the engine core further comprises a second turbine, a second compressor, and a second core shaft connecting the second turbine to the second compressor; and the second turbine, second compressor, and second core shaft are arranged to rotate at a higher rotational speed than the first core shaft.

16. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5,
the turbine rotor blades have platforms and shrouds, the inlet is defined between the platforms and the shrouds of the first stage of turbine rotor blades and the outlet is defined between the platforms and the shrouds of the last stage of turbine rotor blades,
the upstream ends of the platforms of the first stage of turbine rotor blades are arranged at a first radius, the downstream ends of the platforms of the last stage of turbine rotor blades are arranged at a second radius,
the turbine comprises a plurality of axially spaced stages of turbine stator vanes, the turbine stator vanes have platforms, a first stage of turbine stator vanes is arranged upstream of the first stage of turbine rotor blades and a last stage of turbine stator vanes is arranged upstream of the last stage of turbine rotor blades, an intermediate stage of turbine stator vanes is arranged downstream of the first stage of turbine stator vanes and upstream of the last stage of turbine stator vanes, the platforms of the intermediate stage of turbine stator vanes have a third radius, the third radius is greater than or equal to the first radius and is greater than the second radius,
the ratio of the first radius to the second radius is greater than or equal to 0.8 and less than or equal to 1.17, the ratio of the third radius to the first radius is greater than or equal to 1 and less than or equal to 1.3 and the ratio of the second radius to the third radius is greater than or equal to 0.8 and less than or equal to 0.95.

17. A gas turbine engine for an aircraft comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5,
the turbine rotor blades have platforms and shrouds, the inlet is defined between the platforms and the shrouds of the first stage of turbine rotor blades and the outlet is defined between the platforms and the shrouds of the last stage of turbine rotor blades,
the upstream ends of the platforms of the first stage of turbine rotor blades are arranged at a first radius, the downstream ends of the platforms of the last stage of turbine rotor blades are arranged at a second radius, an intermediate stage of turbine rotor blades is arranged downstream of the first stage of turbine rotor blades and upstream of the last stage of turbine rotor blades, the platforms of the intermediate stage of turbine rotor blades have a third radius, the third radius is greater than or equal to the first radius and is greater than the second radius,
the ratio of the first radius to the second radius is greater than or equal to 0.8 and less than or equal to 1.17, the ratio of the third radius to the first radius is greater than or equal to 1 and less than or equal to 1.3 and the ratio of the second radius to the third radius is greater than or equal to 0.8 and less than or equal to 0.95.

18. A gas turbine engine according to claim 1, wherein the fan has a diameter greater than 250 cm and the turbine has a length between the inlet and the outlet between 230 mm and 580 mm.

19. A method of operating a gas turbine engine for an aircraft, the gas turbine engine comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft, wherein:
the turbine comprises a turbine rotor and a plurality of stages of axially spaced turbine rotor blades mounted on the turbine rotor, the turbine rotor and turbine rotor blades are surrounded by a turbine casing, the turbine has an inlet defined at an upstream end of a first stage of turbine rotor blades and an outlet defined at a downstream end of a last stage of turbine rotor blades, a ratio of the area of the outlet to the area of the inlet is at least 2.5 and is no more than 3.5,
the method comprising operating the gas turbine engine with a mean axial Mach number at the inlet to the first stage of turbine rotor blades equal to or greater than 0.15 and equal to or less than 0.35 at cruise conditions and the mean axial Mach number at the outlet of the last stage of turbine rotor blades is equal to or greater than 0.45 and is equal to or less than 0.60 at cruise conditions.

20. The method of operating a gas turbine engine for an aircraft according to claim 19 wherein the last stage of turbine rotor blades $AN^2$ is equal to or greater than $6.0 \text{ in}^2 \times RPM^2/1 \times 10^{10}$ and is equal to or less than $7.0 \text{ in}^2 \times RPM^2/1 \times 10^{10}$ at the highest turbine rotor speed conditions.

* * * * *